United States Patent
Morimoto et al.

(10) Patent No.: US 8,178,793 B2
(45) Date of Patent: May 15, 2012

(54) CHASSIS, ELECTRONIC EQUIPMENT AND MANUFACTURING METHOD FOR CHASSIS

(75) Inventors: Jun Morimoto, Kanagawa-ken (JP); Yukinori Aoki, Kanagawa-ken (JP); Shouichi Nishikawa, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 294 days.

(21) Appl. No.: 12/476,662

(22) Filed: Jun. 2, 2009

(65) Prior Publication Data

US 2009/0296325 A1     Dec. 3, 2009

(30) Foreign Application Priority Data

Jun. 3, 2008 (JP) ................................. 2008-145519
Sep. 2, 2008 (JP) ................................. 2008-224830

(51) Int. Cl.
*H01L 23/02* (2006.01)
*H05K 5/06* (2006.01)
(52) U.S. Cl. ........................ 174/564; 277/640
(58) Field of Classification Search ............ 174/564, 174/50.61, 50.62; 277/640
See application file for complete search history.

(56) References Cited

U.S. PATENT DOCUMENTS 5,394,306 A * 2/1995 Koenck et al. ................ 361/809
2008/0066956 A1 * 3/2008 Lawlyes et al. ............... 174/535

FOREIGN PATENT DOCUMENTS

| JP | 2004-165049 | 6/2004 |
| JP | 2005-10699 | 1/2005 |
| JP | 2005-346932 | 12/2005 |
| JP | 2006-11163 | 1/2006 |

OTHER PUBLICATIONS

Japanese Office Action issued Dec. 7, 2011, in Patent Application No. 2008-224830 (with English-language translation).

* cited by examiner

*Primary Examiner* — Hung Ngo
(74) *Attorney, Agent, or Firm* — Oblon, Spivak, McClelland, Maier & Neustadt, L.L.P.

(57) ABSTRACT

A chassis includes: a flat plate portion including a first major surface and a second major surface facing the first major surface; a protruding portion provided on an outer edge of the flat plate portion and protruding in a direction crossing the first and second major surfaces; and a seal portion provided on the outer edge of the flat plate portion.

18 Claims, 12 Drawing Sheets

CHASSIS, ELECTRONIC EQUIPMENT AND MANUFACTURING METHOD FOR CHASSIS

CROSS-REFERENCE TO RELATED APPLICATIONS

This application is based upon and claims the benefit of priority from the prior Japanese Patent Application No. 2008-145519, filed on Jun. 3, 2008 and the prior Japanese Patent Application No. 2008-224830, filed on Sep. 2, 2008; the entire contents of which are incorporated herein by reference.

BACKGROUND OF THE INVENTION

1. Field of the Invention

This invention relates to a chassis, an electronic equipment and a method for manufacturing the chassis.

2. Background Art

It is necessary for an electronic equipment incorporating an electronic component such as a display panel (for example, flat display panel such as liquid crystal display panel and organic EL display panel), a switch and a circuit board that the electronic component is not broken even if an external force and a mechanical impact are applied. Hence, a chassis of the electronic equipment is desired to have high rigidity so that the incorporated electronic component is not broken in spite of the external force and mechanical impact.

It is known that the chassis of electronic equipment is based on a molded part formed by filling a molten alloy made of nonferrous metal such as aluminum and magnesium into a mold, a so-called die-cast molded part. A die-cast molding method serving as a molding method of filling the molten nonferrous metal alloy into the mold with a high pressure enables a thin-walled molded part to be produced. Hence, there is an advantage of capable of producing a chassis with a high rigidity and being light in weight. However, wall thickness reduction is limited in consideration of fluency of flow of the molten nonferrous metal alloy. This means that there are limitations in weight reduction, slimming down and downsizing of the electronic equipment based on the chassis formed by the die-cast molding method.

JP-A 2005-10699(Kokai) proposes a technique to form the chassis by integral molding of a core made of a metallic material and a resin using an insert molding method. The integral molding of the core made of the metallic material and the resin using the insert molding method allows high rigidity achievement, weight reduction, thickness reduction and downsizing of the chassis, furthermore high rigidity achievement, weight reduction, slimming down and downsizing of the electronic equipment to be sought.

However, in the technique disclosed in JP-A 2005-10699 (Kokai), it is not considered that a pressure during the resin filling causes the core in a seal portion to deform and become misaligned. Hence, there is a fear of exposing the core incorporated in the seal portion from the resin surface.

Moreover, there is a large difference between a thermal expansion coefficient of the metallic material and that of the resin material, hence there is also a fear of occurrence of a warp of the chassis during cooling of the filled resin.

The exposure of the core incorporated in the seal portion from the resin surface and the occurrence of the warp of the chassis cause decrease of product quality.

SUMMARY OF THE INVENTION

According to an aspect of the invention, there is provided a chassis including: a flat plate portion including a first major surface and a second major surface facing the first major surface; a protruding portion provided on an outer edge of the flat plate portion and protruding in a direction crossing the first and second major surfaces; and a seal portion provided on the outer edge of the flat plate portion.

According to another aspect of the invention, there is provided a chassis including: a flat plate portion including a first major surface and a second major surface facing the first major surface; and a seal portion provided on an outer edge of the flat plate portion and including a flesh subtracted portion having a resin removed, the flesh subtracted portion being provided for a difference between a thermal stress occurring on the first major surface side and a thermal stress occurring on the second major surface side to be reduced.

According to another aspect of the invention, there is provided an electronic equipment including: a chassis including: a flat plate portion including a first major surface and a second major surface facing the first major surface; a protruding portion provided on an outer edge of the flat plate portion and protruding in a direction crossing the first and second major surfaces; and a seal portion provided on the outer edge of the flat plate portion; and an electronic component provided on at least any side of the first and second major surfaces.

According to another aspect of the invention, there is provided a method for manufacturing a chassis including: sealing an outer edge of a core with a resin, the core including a flat plate portion and a protruding portion provided on an outer edge of the flat plate portion and protruding in a direction crossing a major surface of the flat plate portion.

According to another aspect of the invention, there is provided a method for manufacturing a chassis including sealing an outer edge of a flat plate portion including a first major surface and a second major surface facing the first major surface with a resin, the method for manufacturing the chassis including: providing a flesh subtracted portion having the resin removed for a portion sealed with the resin to reduce a difference between a thermal stress occurring on the first major surface side and a thermal stress occurring on the second major surface side.

DETAILED DESCRIPTION OF THE INVENTION

Figure 1A:
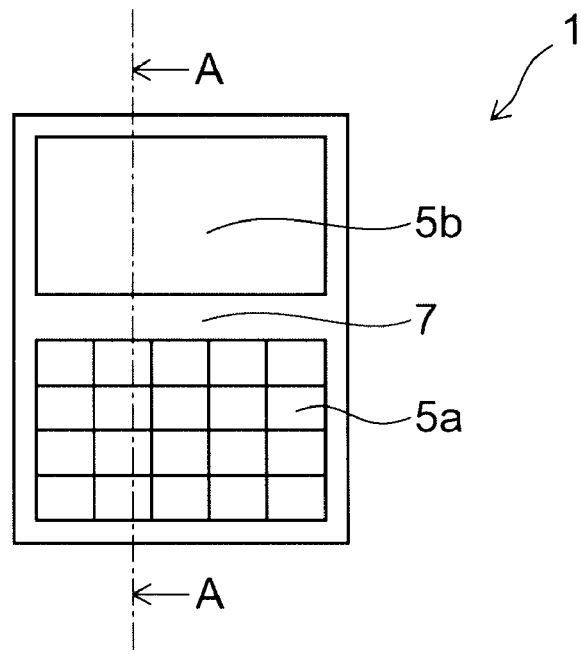
FIGS. 1A and 1B are schematic views for illustrating an electronic equipment according to an embodiment of the invention.

Embodiments of the invention will now be described with reference to the drawings. In the drawings, like components are labeled with like reference numerals, and the detailed description thereof is omitted as appropriate.

Figure 1B:
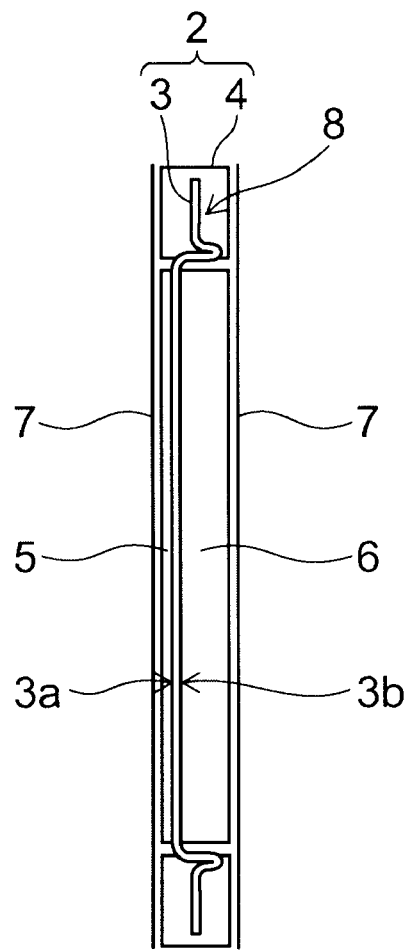

FIGS. 1A and 1B are schematic views for illustrating an electronic equipment according to an embodiment of the invention. FIG. 1A shows a front view of the electronic equipment and FIG. 1B shows a cross-sectional view taken in a direction of the arrows A-A of FIG. 1A.

Here, the electronic equipment illustrated in FIGS. 1A and 1B illustrates a personal digital equipment provided with an input mechanism such as a key switch and an output mechanism such as a flat display panel as an example of the electronic equipment according to this embodiment of the invention. The personal digital equipment can be illustrated as a portable computer, various portable audio player and video player, a personal digital assistant such as PDA (Personal Digital Assistant) and a cellular phone. However, the personal digital equipment is not limited thereto, but can be applied to various electronic equipments.

As shown in FIGS. 1A and 1B, the electronic equipment 1 is provided with a chassis 2. The chassis 2 is provided with a seal portion 4 surrounding the surrounds in a frame configuration and a core 3 shaped like a plate integrally molded with the seal portion 4 by sealing at least part of an outer edge portion 8 into the seal portion 4 (see FIGS. 2A and 2B). A major surface of the core 3 is exposed to an inside of the seal portion 4 (center side of chassis 2) shaped like a frame. That is, the core 3 is comprised of a flat plate portion having a first major surface 3a and a second major surface 3b facing thereto and the seal portion 4 is provided on an outer edge of the flat plate portion (core).

The first major surface 3a of the flat plate portion of the core 3 is provided with operation members 5 including the input mechanism 5a such as the key switch and the output mechanism 5b such as the flat panel display. Moreover, working members 6 including a circuit board and a power supply are provided on the second major surface 3b facing the first major surface 3a.

In this case, a side on which an user operates, namely, a side of the first major surface 3a provided with the operation members 5 serves as a front side of the electronic equipment 1 and the second major surface 3b facing the front side serves as a back side. Generally, thickness direction dimensions of the operation members 5 including the input mechanism and output mechanism are smaller than thickness direction dimensions of the working members 6 including the circuit board and the power supply. Hence, in consideration of ease of operation, the operation members 5 are provided on the first major surface 3a, and in consideration of space efficiency, the member with a small thickness direction dimension is provided on the first major surface 3a and the member with a large thickness direction dimension is provided on the second major surface 3b.

Thus, the side on which the members are provided is determined also in consideration of the space efficiency, thereby, positions of the first major surface 3a and the second major surface 3b in the thickness direction are not located at the center in the thickness direction of the chassis 2, but at a position shifted to the front side.

Here, the chassis 2 is desired to have high rigidity so that the incorporated electronic components including the operation members 5 and the working members 6 are not broken in spite of an external force and mechanical impact. On the other hand, it is also necessary to reduce the weight, slim down and downsize for the chassis 2 as much as possible for the weight reduction, slimming down and downsizing of the electronic equipment 1. For that reason, the seal portion 4 is formed with a resin material with small density to reduce the weight, slim down and downsize, and the core 3 is formed with a metallic material with high rigidity to have the high rigidity. In this case, if the seal portion 4 made of the resin material and the core 3 made of the metallic material are integrated using the insert molding method, production on a larger scale and cost reduction can be sought.

The resin material used for the seal portion 4 can be illustrated as a thermo plastic resin and a thermosetting resin. Here, when using the insert molding method, it is preferred to use the thermo plastic resin.

The thermo plastic resin is not particularly limited. For example, followings are illustrated, polyethylene (PE), high density polyethylene (HDPE), medium density polyethylene (MDPE), low density polyethylene (LDPE), polypropylene (PP), polyvinyl chloride (PVC), polyvinylidene chloride, polystyrene (PS), polyvinyl acetate (PVAc), fluorine resin (for example, polytetrafluoroethylene (PTFE)), ABS resin (acrylonitrile butadiene styrene resin), AS resin, acrylic resin (PMMA), polyamide (PA), nylon, polyacetal (POM), polycarbonate (PC), modified polyphenylene ether (m-PPE, modified PPE), polybuthylene terephthalate (PBT), polyethylene terephthalate (PET), polyethylene terephthalate with glass resin (PET-G), glass fiber reinforced polyethylene terephthalate (GF-PET), cyclic polyolefin (COP), celluloses, rubber/elastomers or the like. These can be mixed for use. A resin additive can be added as necessary. The resin additive can be illustrated as a thermo stabilizer, an antioxidant, an ultraviolet stabilizer, an antistatic additive, a coloring agent, a fire retardant, a lubricant, a blocking inhibitor, a nucleator, a plasticizer, an antibacterial agent and a deodorant.

The material used for the core 3 is not particularly limited as long as the material has higher rigidity than the material used for the seal portion 4. For example, a metallic material such as stainless steel, an inorganic material such as ceramics and a high rigidity resin such as a carbon fiber reinforced resin can be illustrated. Here, various formation methods can be selected in accordance with characteristics of respective materials in formation of the core 3 so that the core has a prescribed shape described later. For example, a sheet-metal working can be used in the case of making the core 3 of a metallic plate material including the stainless steel. A die-cast molding method can be used in the case of making the core 3 of an alloy including aluminum and magnesium. A pressing method and extrusion molding method can be used in the case of making the core 3 of the inorganic material including ceramics. The extrusion molding method can be used in the case of making the core 3 of the high rigidity resin including the carbon fiber reinforced resin. However, without limitation to these methods, an appropriate change may be allowed.

An envelope 7 is provided on an outer surface of the chassis 2. The envelope 7 can be made of a resin material such as an elastomer. However, without limitation to this, various materials of metal materials can be used.

Next, the chassis 2 according to the embodiment of the invention is further illustrated.

Figure 2A:
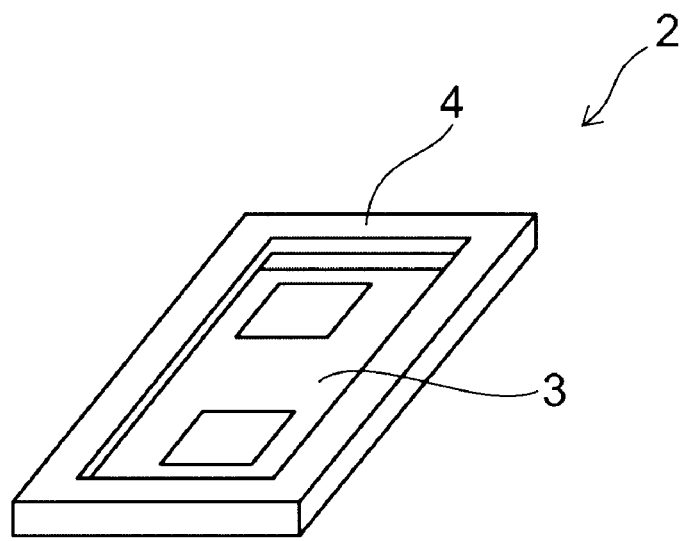
FIGS. 2A and 2B are schematic perspective views for illustrating a chassis according to the embodiment of the invention.
Figure 2B:
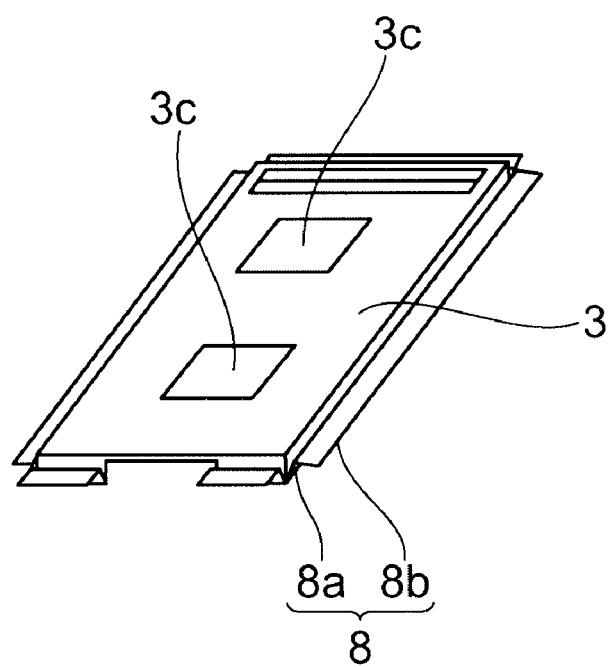

FIGS. 2A and 2B are schematic perspective views for illustrating the chassis according to the embodiment of the invention. FIG. 2A is the schematic perspective view of the chassis and FIG. 2B is the schematic perspective view of the core provided on the chassis.

As shown in FIG. 2A, the chassis 2 is provided with the seal portion 4 surrounding the surrounds in a frame configuration and the core 3 shaped like a plate integrally molded with the seal portion 4 by sealing at least part of the outer edge portion 8 into the seal portion 4.

As shown in FIG. 2B, the outer edge portion 8 having a protruding portion 8a and a projecting portion 8b is provided on the outer edge of the major surfaces 3a and 3b of the flat plate portion of the core 3.

A hole 3c penetrating the major surfaces (first major surface 3a, second major surface 3b) of the core 3 is provided as appropriate. The hole 3c is illustratively used for interconnecting members provided on the first major surface 3a and the second major surface 3b or so.

Next, the outer edge portion 8 of the core 3 is further illustrated.

Figure 3A:
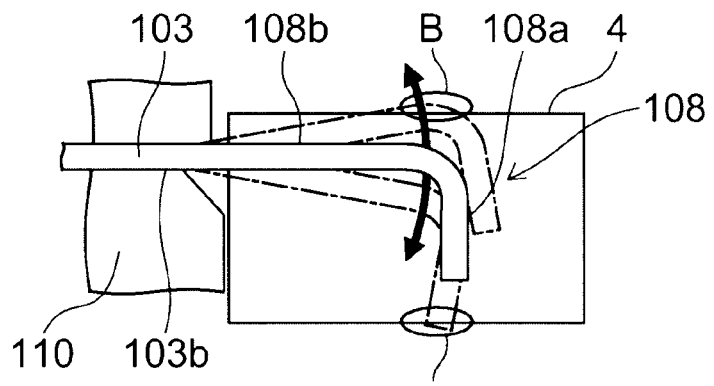
FIGS. 3A and 3B are schematic cross-sectional views for illustrating a first comparative example of an outer edge portion.
Figure 3B:
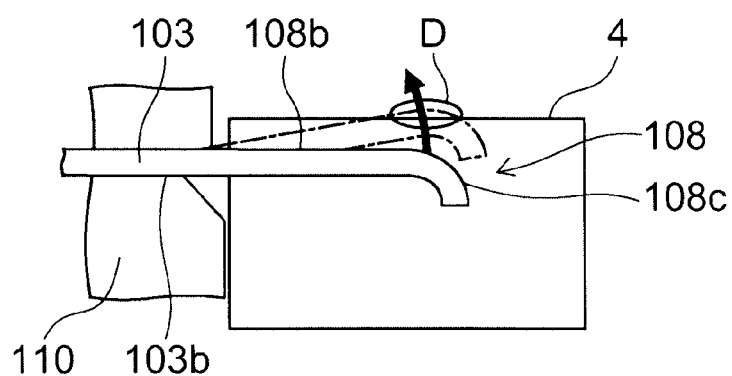

FIGS. 3A and 3B are schematic cross-sectional views for illustrating a first comparative example of an outer edge portion. FIG. 3A is the schematic cross-sectional view for illustrating the case of the long protruding portion, and FIG. 3B is the schematic cross-sectional view for illustrating the case of the short protruding portion.

As shown in FIG. 3A, a protruding portion 108a is provided on an outer edge portion 108 of a core 103. The protruding portion 108a is bent at a substantially right angle toward a side of a second major surface 103b (back side) of the core 103. The protruding portion 108a is hold at a position inside the seal portion 4 by the die 110 during sealing with a resin. Thus, part of the core 103 connecting to the protruding portion 108a and protruding portion 108a come to be sealed inside the seal portion 4 because of sealing with the resin. Here, the part of the core 103 sealed inside the seal portion 4 is referred to as an inserted portion 108b.

Here, the rigidity of the chassis can be increased with increase of a length of the inserted portion 108b. This is because the inserted portion 108b made of the metallic material or the like has higher rigidity (Young's modulus is large) than the seal portion 4 made of the resin material or the like. Moreover, the rigidity of the chassis can be increased with increase of a length of the protruding portion 108a (length of folded back portion). This is because a flexural rigidity of the core 103 can be increased by reason of increasing sectional second moment with increase of the length of the protruding portion 108a (length of folded back portion).

During sealing with the resin, the protruding portion 108a and the inserted portion 108b are hold in a space filled with the resin inside the die. In this case, the protruding portion 108a and the inserted portion 108b are unable to be directly held by the die 110. Here, it is difficult to flow a resin uniformly during filling the resin into the die. Hence, a force comes to be applied to the protruding portion 108a and the inserted portion 108b inhomogeneously, and the protruding portion 108a and the inserted portion 108b occasionally deform.

FIGS. 3A and 3B show a case where the inserted portion 108b deforms. As shown in FIG. 3A, in the case where the protruding portion 108a is long, only slight deformation of the inserted portion 108b threatens to expose part of the protruding portion 108a and the inserted portion 108b from the outer surface of the seal portion 4. For example, in FIG. 3A, the part of the protruding portion 108a and the inserted portion 108b has the fear of exposure at portions of B and C in the figure.

As shown in FIG. 3B, in the case where a protruding portion 108c is short, an end of the protruding portion 108c can be prevented from exposing from the outer surface of the seal portion 4. However, the core 103 is not provided at the center in the thickness direction of the chassis but at a position shifted to the front side. Hence, only slight deformation of the inserted portion 108b threatens to expose the part of the protruding portion 108a and the inserted portion 108b from the outer surface on the front side of the seal portion 4. This situation is the same as the case described with reference to FIG. 3A, and particularly the part of the protruding portion and the inserted portion becomes easy to expose from the outer surface on the front side of the seal portion 4. Moreover, the rigidity can be increased with increase of the length of the inserted portion, but on the other hand, the part of the protruding portion and the inserted portion becomes easy to expose from the outer surface.

Thus, the exposure of the part of the protruding portion and the inserted portion from the outer surface of the seal portion 4 works against fixing the envelope 7 and results in remarkable degradation of the marketability. That is, product quality decreases remarkably.

Figure 4A:
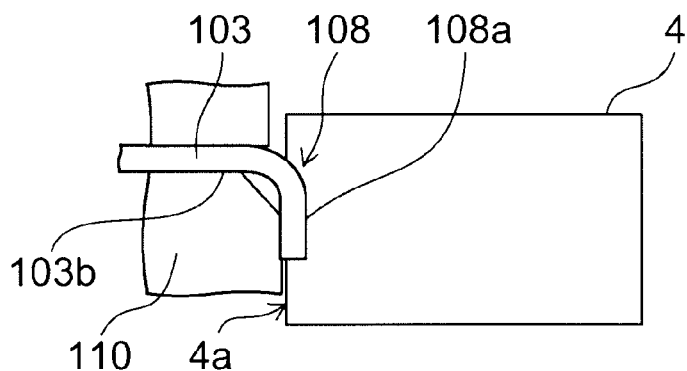
FIGS. 4A and 4B are schematic cross-sectional views for illustrating a second comparative example of an outer edge portion.
Figure 4B:
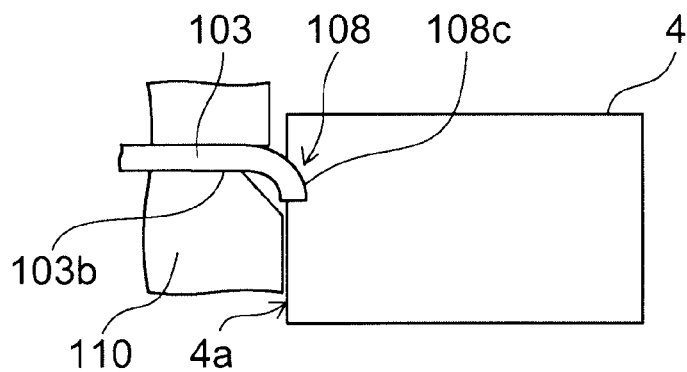

FIGS. 4A and 4B are schematic cross-sectional views for illustrating a second comparative example of an outer edge portion. FIG. 4A is the schematic cross-sectional view for illustrating the case of the long protruding portion, and FIG. 4B is the schematic cross-sectional view for illustrating the case of the short protruding portion.

As shown in FIG. 4A, the protruding portion 108a is provided on the outer edge portion 108 of the core 103. The protruding portion 108a is bent at a substantially right angle to the side of the second major surface 103b (back side) of the core 103. In this comparative example, the protruding portion 108a is hold at a position near an inner periphery 4a inside the seal portion 4 by the die 110 during sealing with the resin. Moreover, the die 110 is configured to support one surface of the protruding portion 108a during sealing with the resin. In this case, the inserted portion 108b described in FIGS. 3A and 3B is not provided.

As shown in FIG. 4B, the protruding portion 108c is provided on the outer edge portion 108 of the core 103. The protruding portion 108c is bent at a substantially right angle to the side of the second major surface 103b (back side) of the core 103. Here, a length of the protruding portion 108c is shorter than a length of the protruding portion 108a described in FIG. 4A. Also in this comparative example, the protruding portion 108c is hold at a position near the inner periphery 4a inside the seal portion 4 by the die 110 during sealing with the resin. Moreover, the die 110 is configured to support one surface of the protruding portion 108c during sealing with the resin. In this case, the inserted portion 108b described in FIGS. 3A and 3B is not provided.

In the case of FIGS. 4A and 4B, one surface of the protruding portions 18a, 18c can be supported with the die 110. The inserted portion 108b described in FIGS. 3A and 3B is not provided. Hence, deformation of the protruding portions 108a, 108c occurring during filling the die with the resin can be suppressed. However, the portion of the core 103 provided inside the seal portion 4 decreases, and then the rigidity of the chassis degrades.

Figure 5A:
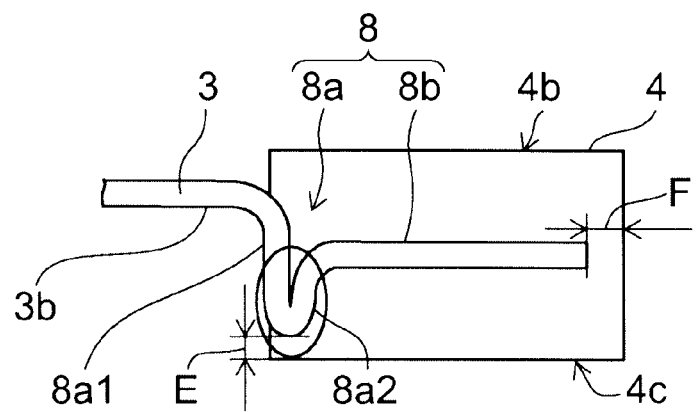
FIGS. 5A and 5B are schematic cross-sectional views for illustrating an outer edge portion according to this embodiment.
Figure 5B:
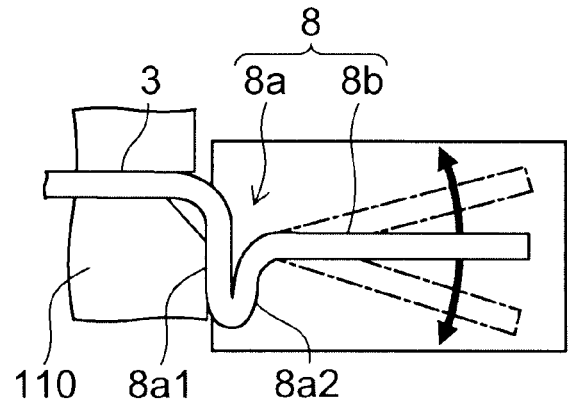

FIGS. 5A and 5B are schematic cross-sectional views for illustrating the outer edge portion according to this embodiment. FIG. 5A is the schematic cross-sectional view for illustrating a state inside the seal portion, and FIG. 5B is the schematic cross-sectional view for illustrating deformation during sealing with the resin.

As shown in FIGS. 5A and 5B, the outer edge portion 8 having the protruding portion 8a and the projecting portion 8b is provided on the outer edge of the major surfaces 3a, 3b of the flat plate portion of the core 3. The protruding portion 8a is provided so as to protrude from the outer edge of the flat plate portion of the core 3 to the side of the second major surface 3b (back side) of the core 3. That is, the protruding portion 8a is provided on the outer edge of the core 3, and protrudes in a direction crossing the major surfaces (first major surface 3a, second major surface 3b) of the flat plate portion of the core 3.

The protruding portion 8a is provided with a first bent portion 8a1 protruding (bending) to the side of the second major surface 3b (back side) of the core 3 and a second bent portion 8a2 connecting to the first bent portion 8a1 and protruding (bending) in a direction crossing the protruding direction (bending direction) of the first bent portion 8a1. Here, FIGS. 5A and 5B illustrate the case where the first bent portion 8a1 is separated from the second bent portion 8a2, but both may be provided in abutment with each other.

The projecting portion 8b is provided on the outer edge of the protruding portion 8a, which connects to the second bent portion 8a2 and projects in a direction crossing the protruding direction (bending direction) of the second bent portion 8a2, namely, in a direction projecting toward outside as viewed from the center of the core. That is, the projecting portion 8b provided on the outer edge of the protruding portion 8a and projecting in a direction crossing the protruding direction of the protruding portion 8a, namely in a direction projecting toward outside as viewed from the center of the core 3 is provided.

In this case, it is preferable to provide the projecting portion 8b substantially parallel to at least one end face 4b (4c) in the thickness direction of the seal portion 4. Otherwise, it is preferable to provide the projecting portion 8b substantially parallel to the major surfaces 3a, 3b of the core 3.

In the case illustrated in FIGS. 5A and 5B, the first bent portion 8a1 is bent at a substantially right angle to the side of the second major surface 3b (back side) of the core 3, and the second bent portion 8a2 connecting to this is bent to flip substantially vertically. Moreover, the projecting portion 8b connected to the second bent portion 8a2 and bent at a substantially right angle with respect to the second bent portion 8a2 is provided. Here, in the case illustrated in FIGS. 5A and 5B, the major surfaces (first major surface 3a, second major surface 3b) of the core 3 and the end faces 4b, 4c in the thickness direction of the seal portion 4 are configured to be substantially parallel, thereby, the major surfaces 3a, 3b of the core 3 are substantially parallel to the projecting portion 8b.

The portion provided with the projecting portion 8b of the protruding portion 8a is sealed with the resin. In this case, at least the projecting portion 8b is made sealed with the resin. In the case illustrated in FIGS. 5A and 5B, one surface of the first bent portion 8a1, the second bent portion 8a2 and the projecting portion 8b are sealed with the resin.

During sealing with the resin, the die 110 being a forming die is configured to support the protruding portion 8a (first bent portion 8a1). Hence, a surface facing a surface on the side provided with the projecting portion 8b of the protruding portion 8a is made exposed from the seal portion 4.

That is, part of the protruding portion 8a on the flat plate portion side (part on the far side from the projecting portion 8b) is exposed from the seal portion 4.

Thereby, if the die 110 supports an exposed portion of the protruding portion 8a (first bent portion 8a1), deformation of the protruding portion 8a can be suppressed.

Similar to the case illustrated in FIGS. 3A, 3B and FIGS. 4A, 4B, the major surfaces (first major surface 3a, second major surface 3b) of the flat plate portion of the core 3 are not provided at the center in the thickness direction of the chassis 2 but at a position shifted to the front side. Here, in the case of the comparative example illustrated in FIGS. 3A and 3B, the inserted portion 108b extending on the major surfaces of the core is not provided at a center in the thickness direction of the seal portion 4 but at a position shifted to the front side. Thereby, part of the protruding portion 108a and the inserted portion 108b is easy to expose from the outer surface of the front side of the seal portion 4.

On the contrary, in this embodiment, the position of the projecting portion 8b in the thickness direction of the seal portion 4 can be changed as appropriate. That is, the change of a length of the second bent portion 8a2 allows the position of the projecting portion 8b in the thickness direction of the seal portion 4 to be changed as appropriate. In such a case, the projecting portion 8b can be provided at a position where the projecting portion 8b is hard to expose from the outer surface of the seal portion 4. As a result, the exposure of the projecting portion 8b from the outer surface of the seal portion 4 can be suppressed. Independent from the position of the projecting portion 8b, the major surfaces (first major surface 3a, second major surface 3b) can be provided at the position in consideration of space efficiency of attached members.

In this case, as shown in FIG. 5A, the position of the projecting portion 8b can be nearly center in the thickness direction of the seal portion 4. Thus, as shown in FIG. 5B, the exposure of the projecting portion 8b can be prevented on both the front side and the back side of the seal portion 4. However, in the case where a deformation direction of the projecting portion 8b can be expected based on a filling direction of the resin, the projecting portion 8b can be provided at a position where a dimension from the end face in the thickness direction of the seal portion 4 in the deformation direction is longer.

As described above, if the projecting portion 8b is provided so as to be substantially parallel to at least one end face 4b (4c) in the thickness direction of the seal portion 4, the exposure of the projecting portion 8b from the outer surface of the seal portion 4 can be prevented.

As shown in FIGS. 3A and 3B, when the portion of the core sealed with the resin (inserted portion 108b in FIGS. 3A and 3B) is located at the shifted position in the thickness direction of the seal portion 4, the rigidity in the case where the opposite side (back side) is bent in a convex direction is lower than the case where the shifted side (front side) is bent in a convex direction. In a practical operation of the electronic equipment 1, there is a possibility of bending to either side, thus it is preferable that the same rigidity is hold with respect to the deformation in either direction. In this embodiment, the position of the projecting portion 8b can be nearly center in the thickness direction in the seal portion 4, thus, the same rigidity can be hold with respect to either deformation to the front side or the back side.

If a dimension (dimension E in FIG. 5A) between a connecting portion between the first bent portion 8a1 and the second bent portion 8a2 and the end face in the thickness direction of the seal portion 4, or a dimension (dimension F in FIG. 5A) between the projecting portion 8b and the outer periphery of the seal portion 4 is shortened, the rigidity of the chassis 2 can be increased. However, too much shortening threatens of disturbance of flow of the resin melted during sealing with the resin. Thus, it is preferable that E, F are shortened as much as possible in a range without disturbance of the melted resin.

Figure 6:
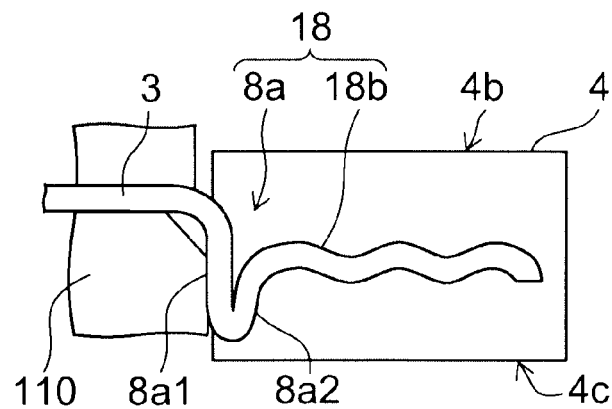
FIG. 6 is a schematic cross-sectional view for illustrating an outer edge portion according to another embodiment.

FIG. 6 is a schematic cross-sectional view for illustrating an outer edge portion according to another embodiment.

As shown in FIG. 6, an outer edge portion 18 having the protruding portion 8a and a projecting portion 18b is provided on the outer edge of the core 3. Similar to the case illustrated in FIGS. 5A and 5B, the protruding portion 8a is provided with the first bent portion 8a1 and the second bent portion 8a2. The projecting portion 18b connected to the second bent portion 8a2 and projecting in a direction crossing the protruding direction of the second bent portion 8a2, namely, projecting toward outside as viewed from the center of the core 3 is provided.

Here, in this embodiment, the projecting portion 18b is provided with an uneven portion. Hence, the rigidity of the projecting portion 18b can be increased and the deformation of the projecting portion 18b during sealing with the resin can be suppressed. Here, the uneven portion may be wavy as illustrated in FIG. 6A, and may be groove shaped or dimply. Moreover, the shape, position, number or size are not limited to one shown in figures, but may be modified as appropriate.

While figures are omitted, a bent portion can also be provided on the front edge of the projecting portion. In consideration of connection between the projecting portion and the resin and fluidity of the resin, a notch or a hole can also be provided on the projecting portion.

Figure 7:
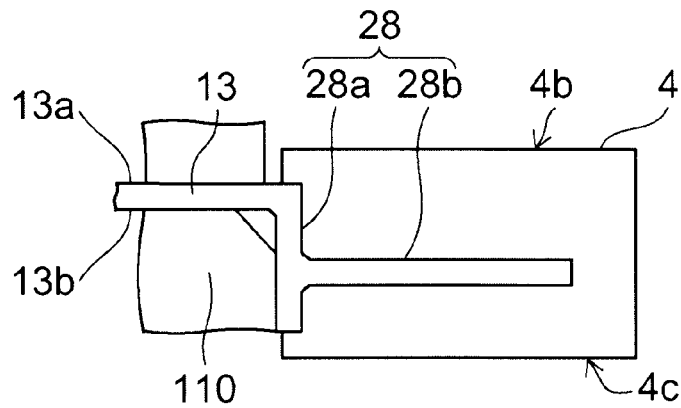
FIG. 7 is a schematic cross-sectional view for illustrating an outer edge portion according to another embodiment.

FIG. 7 is a schematic cross-sectional view for illustrating an outer edge portion according to another embodiment.

As shown in FIG. 7, an outer edge portion 28 including a protruding portion 28a and a projecting portion 28b is provided on an outer edge of a core 13. The protruding portion 28a is provided to protrude from the outer edge of the core 13 to the second major surface 13b side (back side) of the core 13. That is, the protruding portion 28a is provided to protrude in a direction crossing the major surfaces (first major surface 13a, second major surface 13b) of the core 13.

The projecting portion 28b projecting from the protruding portion 28a in a direction crossing the protruding direction of the protruding portion 28a, namely, projecting toward outside as viewed from the center of the core 3 is provided. The outer edge portions illustrated in FIGS. 5A, 5B and FIG. 6 can be illustratively formed using the sheet-metal working. On the other hand, the outer edge portion according to this embodiment can be illustratively formed using the die-cast molding method.

Also in this embodiment, one surface of the protruding portion 28a can be supported with the die 110 being a forming die, hence deformation of the protruding portion 28a can be suppressed. The position of the projecting portion 28b in a thickness direction of the seal portion 4 can be varied as appropriate, thereby the projecting portion 28b can be provided at a position where the projecting portion 28b is hard to expose from the outer surface of the seal portion 4. As a result, the exposure of the projecting portion 28b from the outer surface of the seal portion 4 can be prevented.

Up to this point, prevention of the exposure of the core incorporated in the seal portion during resin filling is illustrated. Here, according to this embodiment, similar to the case described later, the flexural rigidity of the core in the seal portion can also be improved, and thus the chassis warp described later can also be suppressed.

Here, the suppression of the chassis warp occurring during cooling of the filled resin is occasionally more important than the prevention of the exposure of the core from the resin surface depending on the electronic equipment type. For example, in the case where the dimension in the thickness direction of the seal portion 4 is relatively thick, a fear of the core exposure from the resin surface decreases, thus the suppression of the chassis warp only needs to be considered.

Next, the suppression of the chassis warp is illustrated.

The thermal expansion coefficient of resin materials used for the seal portion is larger than the thermal expansion coefficient of metallic materials or the like used for the core. Hence, a thermal stress occurs during cooling of the filled resin. Development of the thermal stress distribution occasionally causes the warp of the chassis.

Figure 8A:
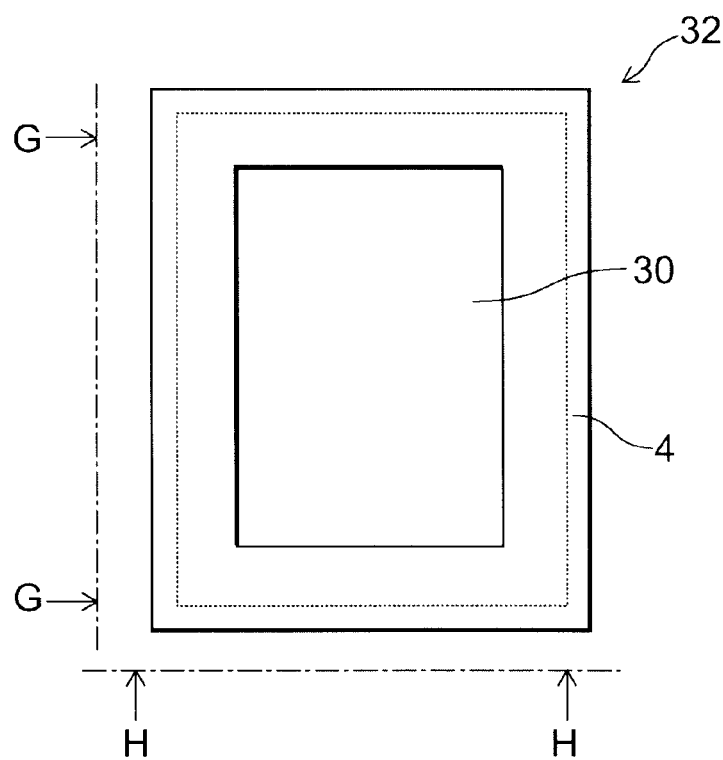
FIGS. 8A to 8C are schematic views for illustrating a warp of a chassis.
Figure 8B:
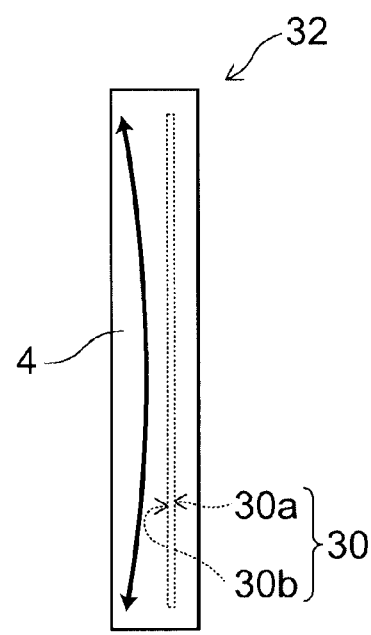
Figure 8C:
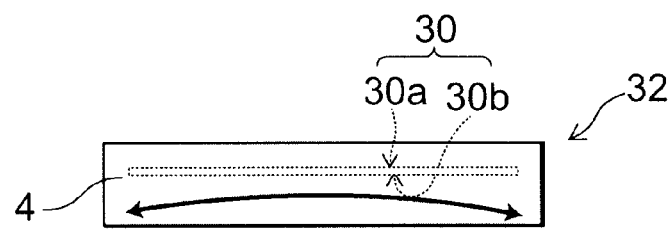

FIGS. 8A to 8C are schematic cross-sectional views for illustrating the warp of the chassis. FIG. 8A is a schematic plan view. FIG. 8B is a view taken in a direction of the arrows G-G of FIG. 8A, and FIG. 8C is a view taken in a direction of the arrows H-H of FIG. 8A.

As described previously, the thermal stress occurs because of a difference of the thermal expansion coefficient between the seal portion 4 and a flat plate portion 30 (core). In this case, the magnitude of the thermal stress occurring varies depending on the thickness dimension of the seal portion 4 in a portion being in contact with the flat plate portion 30 (core), the thermal stress occurring increases with the thickness dimension of the seal portion 4. Hence, an amount of contraction on a side with the thicker thickness dimension of the seal portion 4 in the portion being in contact with the flat plate portion 30 (core) increases, and a chassis 32 results in suffering warping so as to protrude to a side with the thinner thickness dimension of the seal portion 4.

The curved arrows shown in FIGS. 8B, 8C indicate the state of warping of the chassis 32. That is, in the case illustrated in FIGS. 8A to 8C, the thickness dimension of the seal portion 4 being in contact with a major surface 30b side of the flat plate portion 30 is thicker, hence the chassis 32 results in suffering warping so as to protrude to a major surface 30a side with the thinner thickness dimension of the seal portion 4.

The occurrence of the chassis warp like this becomes barrier to provide the major surfaces 30a, 30b of the flat plate portion 30 with the operation members and the working members. The occurrence works against fixing the envelope 7 and results in remarkable degradation of the marketability. That is, product quality decreases remarkably.

The flexural rigidity of the core in the seal portion only needs to be increased in order to suppress the chassis warp like this. Moreover, in order to improve the flexural rigidity of the core in the seal portion, the protruding portion protruding in the direction crossing the first and second major surfaces may be provided on the outer edge of the flat plate portion (core).

FIGS. 9A to 10E are schematic cross-sectional views for illustrating configurations of a protruding portion. FIGS. 9A to 9E show the case where the seal portion has a thin width dimension, and FIGS. 10A to 10E show the case where the seal portion has a thick width dimension.

As shown in FIGS. 9A to 9E and FIGS. 10A to 10E, the core includes the flat plate portion including the first major surface and the second major surface facing thereto, and the seal portion 4 is provided on the outer edge of the flat plate portion (core).

Moreover, protruding portions 38a to 38e protruding in the direction crossing the first and second major surfaces are provided on the outer edge of the flat plate portion (core).

At least part of the protruding portions 38a to 38e is sealed with the seal portion 4. In this case, similar to the case described previously, part of the protruding portions 38a to 38e on the flat plate portion side can also be configured to expose from the seal portion 4.

Figure 9A:
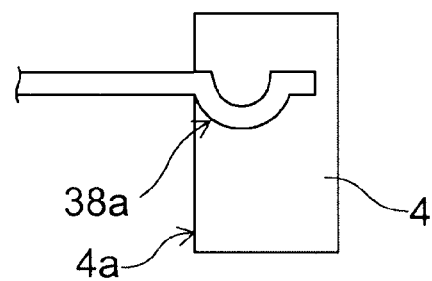
FIGS. 9A to 9E are schematic cross-sectional views for illustrating configurations of a protruding portion.
Figure 9B:
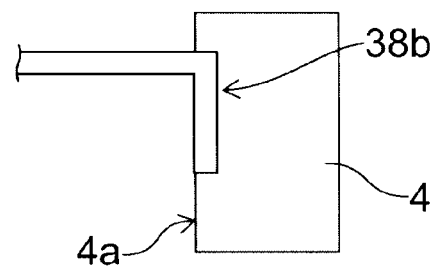
Figure 9C:
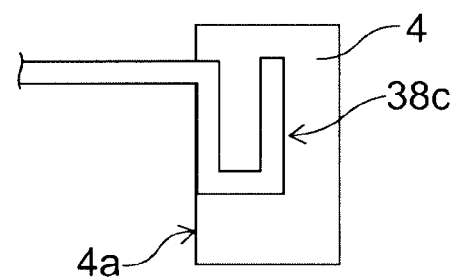
Figure 9D:
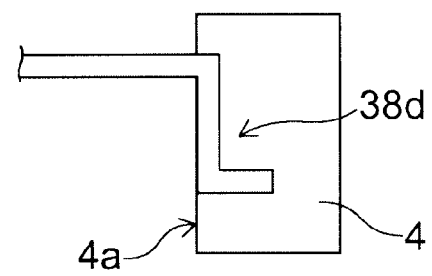
Figure 9E:
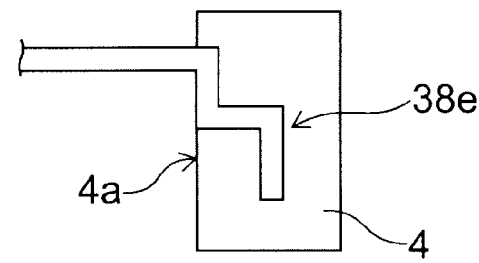
Figure 10A:
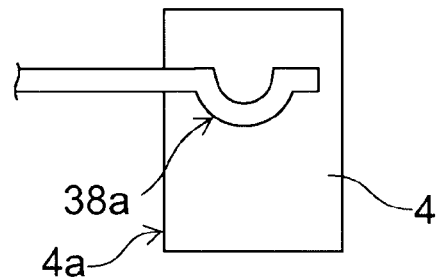
FIGS. 10A to 10E are schematic cross-sectional views for illustrating configurations of a protruding portion.
Figure 10B:
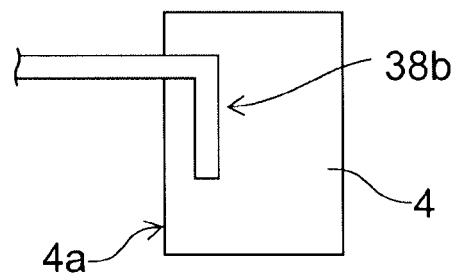
Figure 10C:
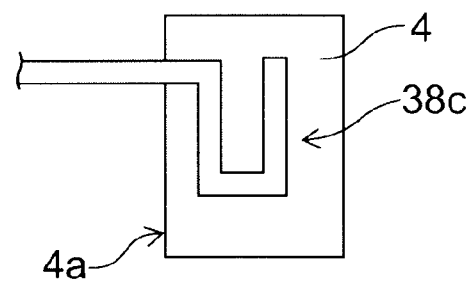
Figure 10D:
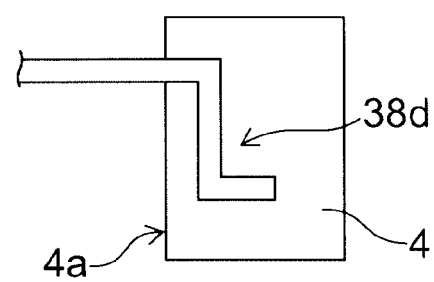
Figure 10E:
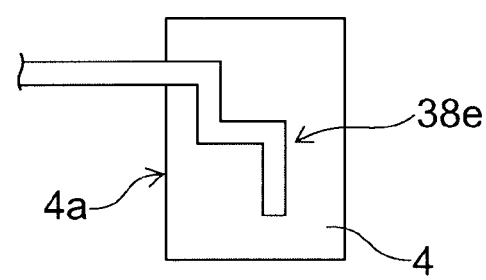
Figure 11A:
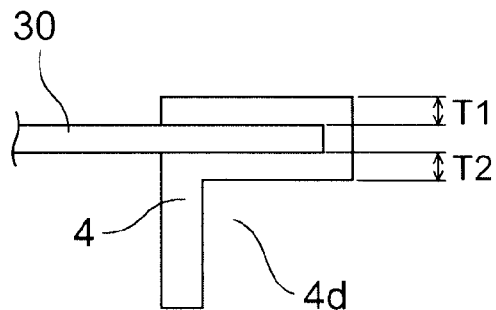
FIGS. 11A to 11E are schematic cross-sectional views for illustrating reduction of a difference of a thickness dimension of a seal portion in a portion being in contact with the core.
Figure 11B:
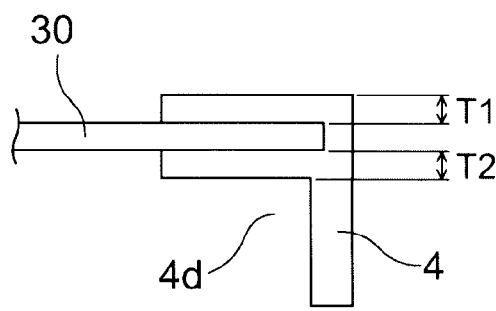
Figure 11C:
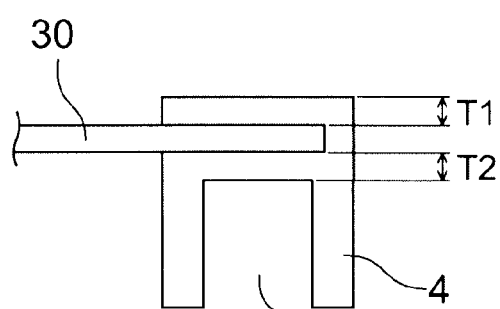
Figure 11D:
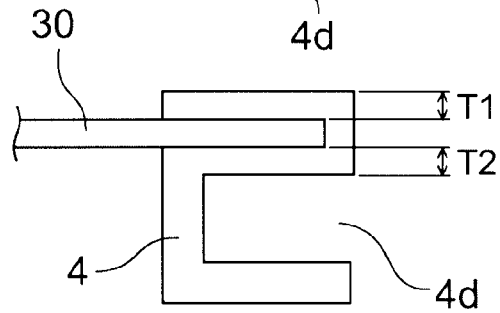
Figure 11E:
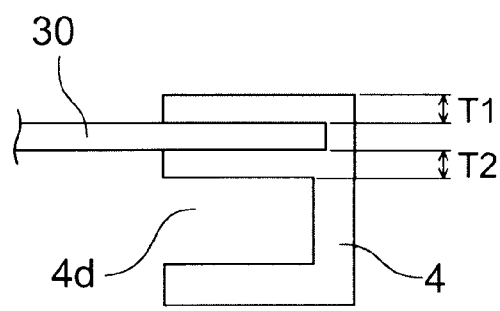

The configuration of the protruding portions 38a to 38e can be illustrated as the curved protruding portion 38a shown in FIG. 9A and FIG. 10A, the L-shaped protruding portion 38b shown in FIG. 9B and FIG. 10B, the U-shaped protruding portion 38c shown in FIG. 9C and FIG. 10C, the Z-shaped protruding portion 38d shown in FIG. 9D and FIG. 10D and the step-shaped protruding portion 38e shown in FIG. 9E and FIG. 10E. However, the configuration is not limited thereto, and can be changed as appropriate. In the cases illustrated in FIG. 9A to FIG. 10E, the protruding portions 38a to 38e protrude to the side with the thicker thickness dimension of the seal portion 4. In the case where the protruding portions 38a to 38e do not expose from the surface of the seal portion 4 during filling the resin, the protruding portions can be configured to protrude to the side with the thinner thickness dimension of the seal portion 4.

The positions of the protruding portions 38a to 38e in the seal portion 4 can also be changed as appropriate. For example, in the case where the seal portion 4 has the thin width dimension, reduction of the chassis strength is relatively low, thereby the protruding portions 38a to 38e can be provided near to the inner periphery 4a as shown in FIGS. 9A to 9E. In such a case, it can be prevented for the protruding portions 38a to 38e in the seal portion 4 from exposing from the resin surface during filling the resin.

In the case where the seal portion 4 has the thick width dimension, there is a fear of the reduction of the chassis strength, thereby the protruding portions 38a to 38e can be provided at positions isolated from the inner periphery 4a as shown in FIGS. 10A to 10E. In such a case, the amount of part made of metallic materials provided in the seal portion 4 increases, thereby the seal portion 4 can be reinforced and furthermore the chassis strength can be increased. Thus, the chassis warp due to the thermal stress occurring during cooling the filled resin can be suppressed.

For example, in the case of the flat plate-like core illustrated in FIG. 8B, assuming the material of the core to be stainless steel and its thickness dimension to be 0.3 mm, the amount of the warp at the center portion results in about 1.5 mm. On the contrary, the amount of the warp at the center portion can be suppressed to be about 0.5 mm by providing the protruding portion illustrated in FIG. 10B and being the dimension protruding from the major surface of the core to be 0.9 mm.

Similar to the case illustrated in FIGS. 5A, 5B and FIG. 6, a projecting portion provided on the outer edge of the protruding portions 38a to 38e and projecting in a direction crossing the protruding direction of the protruding portions 38a to 38e, namely, projecting toward outside as viewed from the center of the flat plate portion can be further included. Further including the projecting portion can reinforce the seal portion 4, furthermore the chassis strength can be further improved. As a result, the chassis warp can be further suppressed.

According to this embodiment, the protruding portion protruding in the direction crossing the major surface of the flat plate portion (core) is provided, hence the flexural rigidity of the core in the seal portion can be improved. Thereby, even if the thermal stress occurs during cooling the filled resin, the chassis warp can be suppressed.

In the case described above, the chassis warp is suppressed by improving the flexural rigidity of the core in the seal portion. On the other hand, the chassis warp can also be suppressed by reducing a difference between the thermal stress occurring on the first major surface side and the thermal stress occurring on the second major surface side. In order to reduce the difference between the occurring thermal stresses, a difference between the thickness dimensions of the seal portion in a part being in contact with the flat plate portion (core) may be decreased. That is, the difference between the thickness dimension of the seal portion on the first surface side and the thickness dimension of the seal portion on the second major surface side may be decreased.

FIGS. 11A to 11E are schematic cross-sectional views for illustrating reduction of the difference of the thickness dimensions of the seal portion in the part being in contact with the core.

In order to reduce the difference of the thickness dimensions of the seal portion in the part being in contact with the core, for example, the seal portion 4 may be provided with a flesh subtracted portion 4d being a part from which the resin is removed. In this case, as illustrated in FIGS. 11A to 11E, the flesh subtracted portion 4d may be provided so as to reduce the difference between a dimension T1 on a side of the thin thickness dimension and a dimension T2 on a side of the thick thickness dimension of the seal portion 4. In such a case, a difference between the thermal stress on the dimension T1 side and the thermal stress on the dimension T2 side can be reduced. The difference between the thermal stresses occurring on both major surface sides of the core can be reduced, thus the chassis warp can be suppressed. In this case, if the dimension T1 and the dimension T2 are substantially the same, the thermal stresses occurring can be substantially balanced.

More specifically, the chassis illustrated in FIGS. 11A to 11E comprise the flat plate portion 30 including the first major surface and the second major surface facing the first major surface and the seal portion 4 including the flesh subtracted portion 4d provided on the outer edge of the flat plate portion 30 and having the resin removed, and the flesh subtracted portion 4d is provided so as to reduce the difference between the thermal stress occurring on the first major surface side and the thermal stress occurring on the second major surface side.

Moreover, the flesh subtracted portion 4d is provided so as to reduce the difference between the thickness dimension T1 of the seal portion 4 on the first major surface side and the thickness dimension T2 of the seal portion 4 on the second major surface portion side.

Here, the size, shape, number and arrangement of the flesh subtracted portion 4d is not limited as illustrated in FIGS. 11A to 11E, but may be changed as appropriate. The flesh subtracted portion 4d is illustrated as the configuration having open one side, but the flesh subtracted portion having a hollow space can also be provided. The reduction of the difference of the thickness dimensions needs not always to be exact, and the size, shape, number and arrangement of the flesh subtracted portion can be decided as appropriate in consideration of product design within an allowable range of the chassis warp.

Figure 12A:
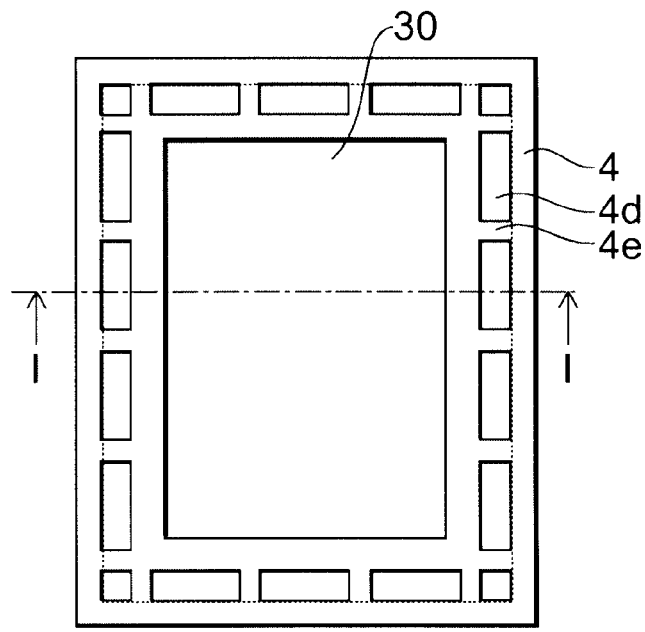
FIGS. 12A and 12B are schematic views for illustrating a manner of providing a flesh subtracted portion.
Figure 12B:
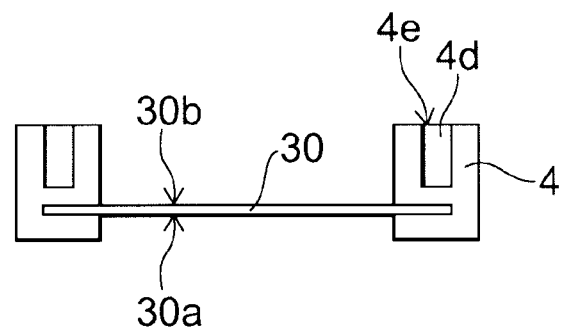
Figure 13A:
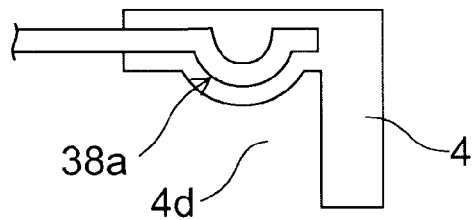
FIGS. 13A to 13E are schematic cross-sectional views for illustrating the case where the protruding portion and the flesh subtracted portion are provided.
Figure 13B:
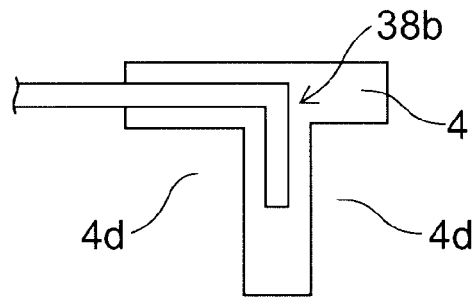
Figure 13C:
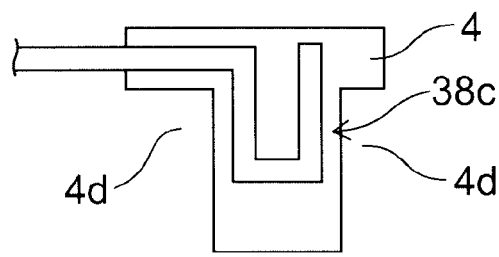
Figure 13D:
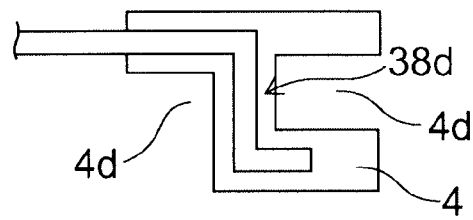
Figure 13E:
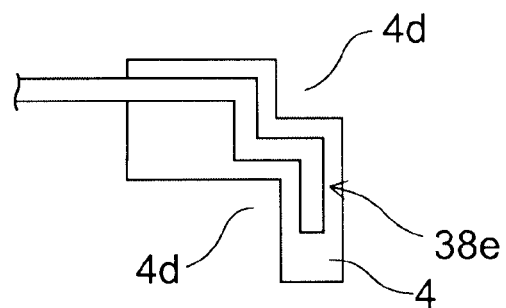

FIGS. 12A and 12B are schematic views for illustrating a manner of providing the flesh subtracted portion. FIG. 12A shows a view from the major surface 30b side, FIG. 12B shows a cross-sectional view taken in a direction of the arrows I-I of FIG. 12A.

As shown in FIGS. 12A and 12B, the flesh subtracted portion 4*d* can be almost uniformly provided along the seal portion 4. In this case, as illustrated in FIG. 12A, reduction of strength of the seal portion can also be suppressed by providing a coupling portion 4*e* appropriately. Here, the size, shape, number and arrangement of the flesh subtracted portion 4*d* and the coupling portion 4*e* are not limited as illustrated in FIG. 12A, but may be changed as appropriate.

This embodiment enables the difference of the thickness dimensions of the seal portion in the part being in contact with the flat plate portion 30 (core) to be reduced by providing the flesh subtracted portion. Hence, the difference of the thermal stresses occurring during cooling the filled resin can be reduced, thus the chassis warp can be suppressed.

Providing the protruding portion and the flesh subtracted portion allows the flexural strength of the core in the seal portion to be improved and the difference of the thermal stresses to be reduced.

FIGS. 13A to 13E are schematic cross-sectional views for illustrating the case where the protruding portion and the flesh subtracted portion are provided.

As shown in FIGS. 13A to 13E, the protruding portions 38*a* to 38*e* provided on the outer edge of the flat plate portion and protruding in the direction crossing the first major surface and the second major surface are provided and the flesh subtracted portion 4*d* is provided as appropriate to reduce the difference of the thickness dimensions of the seal portion 4 in the part being in contact with the protruding portions 38*a* to 38*e* (core), thereby, the chassis warp can be further suppressed. Here, the size, shape, number and arrangement of the protruding portions 38*a* to 38*e* are not limited as illustrated, but can be changed as appropriate. The flesh subtracted portion is illustrated as the configuration having open one side, but the flesh subtracted portion having a hollow space can also be provided. The reduction of the difference of the thickness dimensions needs not always to be exact, and the size, shape, number and arrangement of the flesh subtracted portion can be decided as appropriate in consideration of product design within an allowable range of the chassis warp.

Moreover, similar to the case illustrated in FIGS. 5A, 5B and FIG. 6, the projecting portion can be further provided, which is provided on the outer edge of the protruding portions 38*a* to 38*e* and projects in a direction crossing the protruding direction of the protruding portions 38*a* to 38*e*, namely, in a direction projecting toward outside as viewed from the center of the flat plate portion. Further providing the projecting portion can further strengthen the seal portion 4, and additionally can further improve the strength of the chassis. As a result, the chassis warp can be further suppressed.

Next, the manufacturing method of the chassis and the manufacturing method of the electronic equipment according to embodiments of the invention are illustrated.

Figure 14:
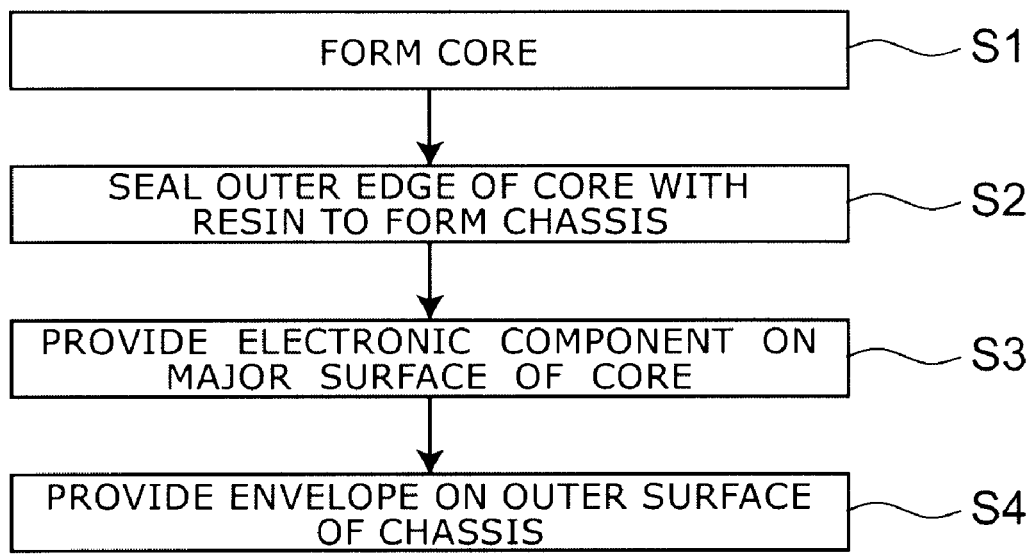
FIG. 14 is a flow chart for illustrating a manufacturing method of a chassis and a manufacturing method of a electronic equipment according to embodiments of the invention.

FIG. 14 is a flow chart for illustrating a manufacturing method of a chassis and a manufacturing method of an electronic equipment according to embodiments of the invention.

As shown in FIG. 14, first, the core is formed (Step S1).

At this time, the major surface (flat surface) is formed, which is provided with the operation member including the input mechanism such as the key switch and the output mechanism including such as the flat panel display, and the working member including the circuit board and the power supply. The outer edge portion having the protruding portion and the projecting portion on the outer edge of the core is formed to connect to the major surface. That is, the core is formed, which includes the protruding portion provided on the outer edge of the major surface and protruding in the direction crossing the major surface, and the projecting portion provided on the protruding portion and projecting in the direction crossing the protruding direction of the protruding portion, namely, toward outside as viewed from the center of the major surface.

In this case, the major surface and the projecting portion are formed to locate at preferable positions, respectively. For example, the position of the major surface of the core can be determined in consideration of the space efficiency in providing the operation member or working member or the like. The position of the projecting portion can be determined to locate at positions where the projecting portion is hard to expose from the outer surface of the seal portion.

As described previously, the uneven portion can be provided on the projecting portion.

As illustrated in FIGS. 9A to 9E and FIGS. 10A to 10E, only the protruding portion can also be provided.

It is also possible not to provide the protruding portion and the projecting portion. In this case, as described later, the flesh subtracted portion may be provided on the part sealed with the resin (seal portion).

The forming method of the core can be selected as appropriate in accordance with characteristics of the core material.

For example, a sheet-metal working can be used in the case of making the core of a metal plate material including the stainless steel. A die-cast molding method can be used in the case of making the core of an alloy including aluminum and magnesium. A pressing method and extrusion molding method can be used in the case of making the core of the inorganic material including the ceramics. The extrusion molding method can be used in the case of making the core of the high rigidity resin including the carbon fiber reinforced resin.

Next, the outer edge of the core is sealed with the resin to form the chassis (Step S2).

In this case, when the projecting portion is provided, it is configured to seal at least the projecting portion with the resin. When the projecting portion is not provided, it is configured to seal at least the protruding portion with the resin. As described previously, the protruding portion surface provided with the projecting portion can also be sealed with the resin. The projecting portion can also be hold substantially at the center in the thickness direction of the part sealed with the resin (seal portion). In sealing with the resin, the protruding portion surface facing the surface provided with the projecting portion can also be supported. The insert molding method can be used for sealing with the resin.

When the protruding portion and the projecting portion are not provided, it is configured to provide the flesh subtracted portion as illustrated in FIGS. 11A to 11E and FIGS. 12A to 12E. That is, it is configured to provide the flesh subtracted portion with the resin removed on the sealed part with the resin so that the difference of the thermal stress occurring on the first major surface side and the thermal stress occurring on the second major surface side decreases.

Here, even if the protruding portion and the projecting portion are provided, it can also be configured to provide the flesh subtracted portion.

FIGS. 15A to 15D are schematic process views for illustrating sealing with the resin based on the insert molding method.

Figure 15A:
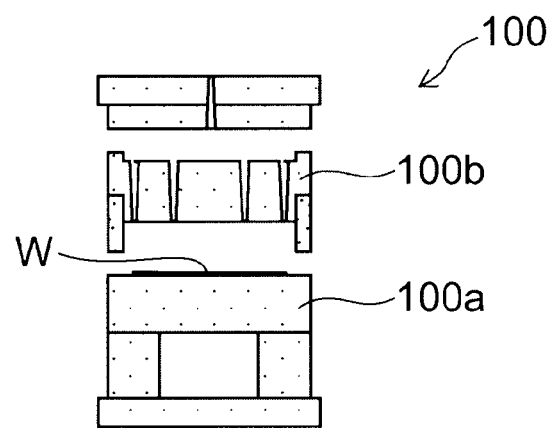
FIGS. 15A to 15D are schematic process views for illustrating sealing with a resin based on an insert molding method.

First, as shown in FIG. 15A, a core W is placed between a female die 100*a* and a male die 100*b* serving as a forming die of an injection molding machine 100.

Figure 15B:
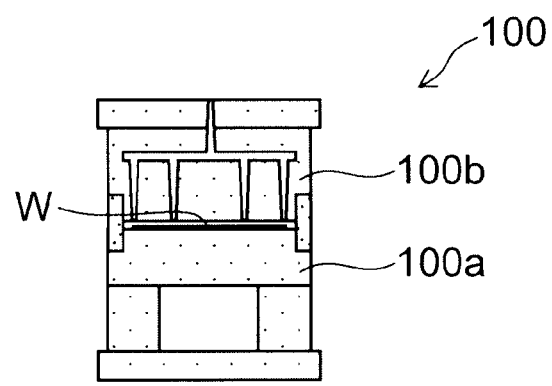

Next, as shown in FIG. 15B, the female die 100*a* and the male die 100*b* are clamped. When clamped, the core is held at a position where the female die 100*a* and the male die 100*b* seal at least part provided with the projecting portion with the resin. The forming die is configured to support the protruding portion.

When the protruding portion is provided but the projecting portion is not, the core is hold at a position where at least part provided with the projecting portion is sealed with the resin. When the protruding portion and the projecting portion are not provided, the core is hold at a position where the outer edge of the core is sealed with the resin.

Figure 15C:
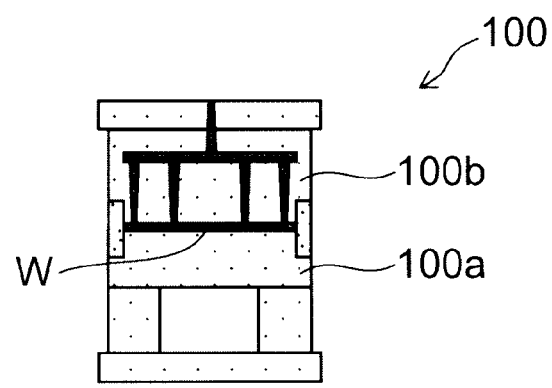

Next, as shown in FIG. 15C, the melted resin is filled into the forming die to seal the outer edge of the core W with the resin. Here, when the protruding portion is supported with the forming die, the deformation of the protruding portion can be suppressed. The projecting portion is formed to locate at a position where the projecting portion is hard to expose from the outer surface of the seal portion, thereby, the exposure of projecting portion from the outer surface of the seal portion can be prevented.

Figure 15D:
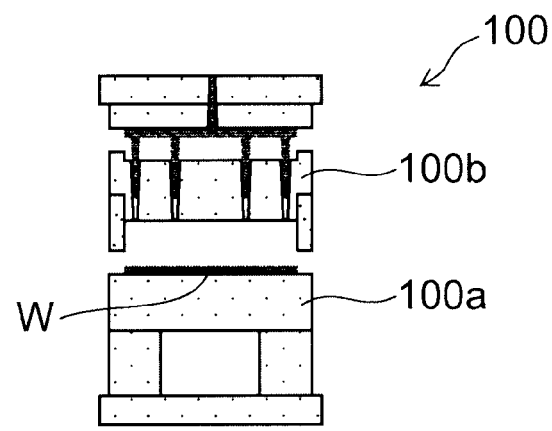

Next, as shown in FIG. 15D, the female die 100a and the male die 100b are opened to take out the chassis (the core W sealed with the resin). Thereafter, burrs are removed and cleaning is performed as appropriate to finish the chassis formation.

Here, when the chassis (the core W sealed with the resin) is taken out, the thermal stress occurs because of cooling the resin portion. According to this embodiment, the chassis warp due to the thermal stress can be suppressed because the flexural rigidity of the core in the seal portion is improved by providing the protruding portion. Moreover, the chassis warp due to the thermal stress can be suppressed because the difference of the thermal stresses occurring is configured to decrease by providing the flesh subtracted portion.

Next, the major surface of the core W is provided with the electronic components including the operation member and the working member and necessary interconnections are made (Step S3).

For example, the operation member can be illustrated as the input mechanism such as a key switch and the output mechanism such as a flat panel display. The working member can be illustrated as a circuit board and a power supply or the like.

Next, the envelope is provided on the outer surface of the core as necessary (Step S4). For example, the envelope can be adhered to the outer surface of the core with an adhesive and a double face tape or the like.

The embodiments of the invention are illustrated, however, the invention is not limited to these description.

Any design changes in the above embodiments suitably made by those skilled in the art are also encompassed within the scope of the invention as long as they fall within the spirit of the invention.

For example, the shape, dimension, material, arrangement and number or the like of the components included in the electronic equipment 1 are not limited to the illustrated case, but can be changed as appropriate.

Any elements included in each embodiment described above can be combined to the extent possible, and these combinations are also encompassed within the scope of the invention as long as they include the features of the invention.

The invention claimed is:
1. A chassis comprising:
a flat plate portion including a first major surface and a second major surface facing the first major surface, the flat plate portion having a component area on at least any side of the first and second major surfaces;
a protruding portion provided on an outer edge of the flat plate portion and protruding in a direction crossing the first and second major surfaces; and
a seal portion provided on the outer edge of the flat plate portion, the seal portion covering the first major surface side and the second major surface side,
wherein a material used for the flat plate portion has a higher rigidity than a material used for seal portion.
2. The chassis according to claim 1, further comprising a projecting portion provided on an outer edge of the protruding portion and projecting in a direction crossing a protruding direction of the protruding portion, toward outside as viewed from a center of the flat plate portion.
3. The chassis according to claim 2, wherein the seal portion seals at least part of a portion connecting to the projecting portion of the protruding portion.
4. The chassis according to claim 2, wherein the projecting portion projects substantially parallel to the first and second major surfaces.
5. The chassis according to claim 2, wherein the projecting portion is provided substantially at a center in a thickness direction of the seal portion.
6. The chassis according to claim 2, wherein the projecting portion includes an uneven portion.
7. The chassis according to claim 2, wherein the projecting portion is provided substantially parallel to at least one end face in a thickness direction of the seal portion.
8. The chassis according to claim 1, wherein part of the protruding portion on the flat plate portion side exposes from the seal portion.
9. The chassis according to claim 1, wherein the flat plate portion is provided on an end face side from a center in a thickness direction of the seal portion.
10. The chassis according to claim 1, wherein the seal portion is formed using an insert molding method.
11. A chassis comprising:
a flat plate portion including a first major surface and a second major surface facing the first major surface, the flat plate portion having a component area on at least any side of the first and second major surfaces; and
a seal portion provided on an outer edge of the flat plate portion and including a flesh subtracted portion having a resin removed, the seal portion covering the first major surface side and the second major surface side,
the flesh subtracted portion being provided for a difference between a thermal stress occurring on the first major surface side and a thermal stress occurring on the second major surface side to be reduced,
wherein a material used for the flat plate portion has a higher rigidity than a material used for seal portion.
12. The chassis according to claim 11, wherein the flesh subtracted portion is provided for a difference between a thickness dimension of the seal portion on the first major surface side and a thickness dimension of the seal portion on the second major surface side to be reduced.
13. The chassis according to claim 11, further comprising a protruding portion provided on an outer edge of the flat plate portion and protruding in a direction crossing the first and second major surfaces.
14. The chassis according to claim 13, further comprising a projecting portion provided on an outer edge of the protruding portion and projecting in a direction crossing a protruding direction of the protruding portion, toward outside as viewed from a center of the flat plate portion.
15. The chassis according to claim 14, wherein the projecting portion is provided to be substantially parallel to at least one end face in a thickness direction of the seal portion.

16. The chassis according to claim 11, wherein the flat plate portion is provided on an end face side from a center in a thickness direction of the seal portion.

17. The chassis according to claim 11, wherein the seal portion is formed using an insert molding method.

18. An electronic equipment comprising:
a chassis including:
a flat plate portion including a first major surface and a second major surface facing the first major surface, the flat plate portion having a component area on at least any side of the first and second major surfaces;
a protruding portion provided on an outer edge of the flat plate portion and protruding in a direction crossing the first and second major surfaces;
a seal portion provided on the outer edge of the flat plate portion, the seal portion covering the first major surface side and the second major surface side, wherein a material used for the flat plate portion has a higher rigidity than a material used for seal portion; and
an electronic component provided on the component area.

* * * * *